United States Patent
Wagle et al.

(10) Patent No.: US 11,566,157 B2
(45) Date of Patent: Jan. 31, 2023

(54) WATER-BASED DRILLING FLUID COMPOSITIONS AND METHODS FOR DRILLING SUBTERRANEAN WELLS

(71) Applicant: Saudi Arabian Oil Company, Dhahran (SA)

(72) Inventors: Vikrant Wagle, Abqaiq (SA); Sara Alkhalaf, Alkhobar (SA); Abdullah Al-Yami, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/176,449

(22) Filed: Feb. 16, 2021

(65) Prior Publication Data

US 2022/0259480 A1  Aug. 18, 2022

(51) Int. Cl.
*C09K 8/04* (2006.01)
*C09K 8/12* (2006.01)
*E21B 21/00* (2006.01)
*C09K 8/508* (2006.01)

(52) U.S. Cl.
CPC .............. *C09K 8/12* (2013.01); *C09K 8/04* (2013.01); *C09K 8/5086* (2013.01); *E21B 21/003* (2013.01); *C09K 2208/12* (2013.01)

(58) Field of Classification Search
None
See application file for complete search history.

(56) References Cited

U.S. PATENT DOCUMENTS

| | | | |
|---|---|---|---|
| 2,761,843 A | | 9/1956 | Brown |
| 2,873,251 A | * | 2/1959 | Jones, Jr. ................. C09K 8/24 507/119 |
| 4,493,771 A | | 1/1985 | Wilson et al. |
| 4,515,708 A | | 5/1985 | Haslegrave et al. |
| 4,666,613 A | * | 5/1987 | Schapira .................. C09K 8/22 507/131 |
| 5,057,467 A | | 10/1991 | Croft |
| 5,558,171 A | | 9/1996 | McGlothlin et al. |
| 5,593,953 A | | 1/1997 | Malchow, Jr. |
| 5,641,385 A | | 6/1997 | Croft et al. |
| 5,964,295 A | | 10/1999 | Brown et al. |
| 6,153,049 A | | 11/2000 | Croft |
| 6,312,560 B1 | | 11/2001 | Croft |
| 7,863,228 B2 | | 1/2011 | Loper et al. |
| 9,434,911 B2 | | 9/2016 | Bennett et al. |
| 9,631,131 B2 | | 4/2017 | Witham et al. |
| 2006/0128571 A1 | | 6/2006 | Loper |
| 2009/0131280 A1 | | 5/2009 | Federici et al. |
| 2010/0096130 A1 | * | 4/2010 | Parlar ...................... C09K 8/04 166/278 |
| 2014/0262319 A1 | | 9/2014 | Treybig et al. |
| 2014/0377013 A1 | * | 12/2014 | Puzrin .................... C09K 17/14 405/264 |
| 2015/0065614 A1 | | 3/2015 | Kuo et al. |
| 2015/0072902 A1 | | 3/2015 | Lafitte et al. |
| 2016/0208158 A1 | | 7/2016 | Monahan et al. |
| 2018/0127557 A1 | | 5/2018 | Reddy et al. |
| 2018/0171198 A1 | * | 6/2018 | Mack ....................... C09K 8/68 |
| 2019/0136110 A1 | | 5/2019 | Albahrani et al. |
| 2020/0071602 A1 | | 3/2020 | Dhawan et al. |
| 2020/0115615 A1 | | 4/2020 | Steves et al. |

FOREIGN PATENT DOCUMENTS

| | | |
|---|---|---|
| WO | 2014123709 A1 | 8/2014 |
| WO | 2014200671 A2 | 12/2014 |
| WO | 2015031270 A1 | 3/2015 |

OTHER PUBLICATIONS

U.S. Office Action dated Sep. 29, 2021 pertaining to U.S. Appl. No. 17/176,434, filed Feb. 16, 2021, 21 pages.
U.S. Office Action dated Feb. 1, 2022 pertaining to U.S. Appl. No. 17/176,453, filed Feb. 16, 2021, 17 pages.
U.S. Office Action dated Mar. 30, 2022 pertaining to U.S. Appl. No. 17/176,434, filed Feb. 16, 2021, 20 pages.

\* cited by examiner

*Primary Examiner* — Andrew Sue-Ako
(74) *Attorney, Agent, or Firm* — Dinsmore & Shohl LLP

(57) ABSTRACT

Water-based drilling fluids may include an aqueous base fluid and a mixture of polyethylene polyamines in an amount of from 1 $lb_m$/bbl to 20 $lb_m$/bbl relative to the total volume of the water-based drilling fluid. The polyethylene polyamines of the mixture may have a first chemical structure $H_2NCH_2CH_2(NHCH_2CH_2)_xNH_2$, where x may be an integer greater than or equal to 3. The average molecular weight of the polyethylene polyamines in the water-based drilling fluid having the first chemical structure may be from 200 g/mol to 400 g/mol. Methods for drilling a subterranean well with the water-based drilling fluids are also disclosed.

20 Claims, No Drawings

WATER-BASED DRILLING FLUID COMPOSITIONS AND METHODS FOR DRILLING SUBTERRANEAN WELLS

BACKGROUND

Field

The present disclosure relates to natural resource well drilling and, more specifically, to water-based drilling fluid compositions and methods for drilling subterranean wells.

Technical Background

Water-based drilling fluids provide various environmental advantages over synthetic and oil-based drilling fluids. However, the advantages of water-based drilling fluids may be limited when drilling subterranean wells in subterranean formations that are composed primarily of clay particles, such as shale formations. The susceptibility of shale formations to hydration by water-based drilling fluids during drilling may result in the sloughing, also referred to as swelling, of the shale formation, the collapse of the borehole, stuck pipes, or the disintegration of the shale formation and a subsequent increase of fines in the water-based drilling fluid. An increase of fines, which are solid particles, in the water-based drilling fluid can negatively affect the rheology of water-based drilling fluids as well as reduce the rate of penetration during drilling. As a result, the hydration of shale formations may increase the drilling time and decrease the efficiency of the drilling process. Conventional water-based drilling fluids may include salts, such as sodium chloride or potassium chloride, as clay stabilizers, also referred to as shale inhibitors or swelling inhibitors, to prevent the hydration of shale formations. However, when used in amounts effective to prevent the hydration of shale formations, these salts may negatively affect the quality of the water and soil in the area surrounding the subterranean formation.

SUMMARY

Accordingly, there is an ongoing need for improved water-based drilling fluid compositions and methods for drilling subterranean wells in shale formations. The compositions and methods of the present disclosure include a water-based drilling fluid that includes a mixture of polyethylene polyamines. The chemical structure of the polyethylene polyamines may facilitate the adsorption of the polyethylene polyamines onto the surface of clay particles present in shale formations during drilling. The adsorption of the polyethylene polyamines onto the surface of the clay particles may reduce or prevent interactions between the clay particles and the aqueous base fluid of the water-based drilling fluid. This reduction or prevention of interaction may, in turn, reduce or prevent the hydration of the shale formation. As a result, the water-based drilling fluid of the present disclosure may decrease drilling time and increase the efficiency of the drilling process of shale formations while also avoiding the negative environmental effects of excessive salt concentrations when compared to some conventional water-based drilling fluids.

According to one or more embodiments of the present disclosure, a water-based drilling fluid may include an aqueous base fluid and a mixture of polyethylene polyamines in an amount of from 1 pound per barrel ($lb_m$/bbl) to 20 $lb_m$/bbl relative to the total volume of the water-based drilling fluid. The polyethylene polyamines of the mixture may have a first chemical structure $H_2NCH_2CH_2(NHCH_2CH_2)_xNH_2$, where x is an integer greater than or equal 3. The average molecular weight of the polyethylene polyamines in the water-based drilling fluid having the first chemical structure may be from 200 grams per mole (g/mol) to 400 g/mol.

According to one or more additional embodiments of the present disclosure, a method for drilling a subterranean well may include operating a drill in a subterranean formation in the presence of a water-based drilling fluid. The water-based drilling fluid may include an aqueous base fluid and a mixture of polyethylene polyamines in an amount of from 1 $lb_m$/bbl to 20 $lb_m$/bbl relative to the total volume of the water-based drilling fluid. The polyethylene polyamines may have a first chemical structure $H_2NCH_2CH_2(NHCH_2CH_2)_xNH_2$, where x is an integer greater than or equal to 3. The average molecular weight of the polyethylene polyamines in the water-based drilling fluid having the first chemical structure may be from 200 g/mol to 400 g/mol.

Additional features and advantages of the technology described in the present disclosure will be set forth in the detailed description that follows, and in part will be readily apparent to those skilled in the art from the description or recognized by practicing the technology as described in this disclosure, including the detailed description that follows, as well as the claims.

DETAILED DESCRIPTION

The present disclosure is directed to water-based drilling fluid compositions and, additionally, to methods for drilling a subterranean well using such water-based drilling fluid compositions. A subterranean formation is the fundamental unit of lithostratigraphy. As used in the present disclosure, the term "subterranean formation" may refer to a body of rock that is sufficiently distinctive and continuous from the surrounding rock bodies that the body of rock can be mapped as a distinct entity. A subterranean formation may be sufficiently homogenous to form a single identifiable unit containing similar geological properties throughout the subterranean formation, including, but not limited to, porosity and permeability. A single subterranean formation may include different regions, where some regions include hydrocarbons and others do not. To extract hydrocarbons from the hydrocarbon regions of the subterranean formation, production wells are drilled. The wellbore of production wells may serve to connect hydrocarbon regions of the subterranean formation to the surface and enable hydrocarbons to travel from the subterranean formation to the surface. As used in the present disclosure, the term "wellbore" may refer to the drilled hole or borehole, including the openhole or uncased portion of the well.

According to one or more embodiments, to drill a subterranean well, a drill string is inserted into a pre-drilled hole and rotated to cut into the rock at the bottom of the hole, producing cuttings. Drilling fluids, also referred to as drilling muds, may be pumped down through the drill string during drilling to remove cuttings from the bottom of the subterranean well. Drilling fluids may lift cuttings away from the bottom of the subterranean well when recirculated back to the surface. Drilling fluids may serve a number of additional functions as well. For example, drilling fluids may also provide hydrostatic pressure in the subterranean well sufficient to support the sidewalls of the subterranean well. This hydrostatic pressure may prevent the sidewalls from collapsing and caving in on the drill string as well as prevent fluids present in the subterranean formation from flowing into the subterranean well during drilling.

However, as stated previously, subterranean formations that are composed primarily of clay particles, such as shale formations, may become hydrated during drilling when water-based drilling fluids are used. When exposed to water-based drilling fluids, clay particles present in the subterranean formation may react and swell. This swelling may reduce the permeability of the subterranean formation and reduce the production of hydrocarbons. This may also lead to the collapse of the wellbore, the drill string becoming stuck, or the disintegration of the shale formation and an increased concentration of fines in the water-based drilling fluid. As a result, the hydration of subterranean formations may increase the time required to drill the subterranean well and a decrease in the efficiency of the drilling.

In one or more embodiments, the present disclosure is directed to water-based drilling fluids that may include an aqueous base fluid and a mixture of polyethylene polyamines in an amount of from 1 $lb_m$/bbl to 20 $lb_m$/bbl relative to the total volume of the water-based drilling fluid. The polyethylene polyamines of the mixture may have a first chemical structure $H_2NCH_2CH_2(NHCH_2CH_2)_xNH_2$, where x may be an integer greater than or equal to 3. The average molecular weight of the polyethylene polyamines in the water-based drilling fluid having the first chemical structure may be from 200 g/mol to 400 g/mol. The water-based drilling fluids of the present disclosure may reduce or prevent the hydration of shale formations. The structure of the polyethylene polyamines of the water-based drilling fluid may facilitate the adsorption of the polyethylene polyamines onto the surface of clay particles present in shale formations during drilling. The adsorption of the polyethylene polyamines onto the surface of the clay particles may reduce or prevent interactions between the clay particles and the aqueous base fluid of the water-based drilling fluid. This reduction or prevention of interaction may, in turn, reduce or prevent the hydration of the shale formation. As a result, the water-based drilling fluid of the present disclosure may decrease drilling time and increase the efficiency of the drilling process of shale formations.

As stated previously in the present disclosure, the water-based drilling fluid may include an aqueous base fluid. As used in the present disclosure, the term "aqueous" may refer to a fluid or solution that includes water as the major constituent. In embodiments, the aqueous base fluid may include at least one of fresh water, salt water, brine, municipal water, formation water, produced water, well water, filtered water, distilled water, seawater, or combinations of these. The brine may include at least one of natural and synthetic brine, such as saturated brine or formate brine. Without being bound by any particular theory, it is believed that brine may be used to create osmotic balance between the water-based drilling fluid and the subterranean formation.

In embodiments, the aqueous base fluid may include water containing organic compounds or salt. Without being bound by any particular theory, salt or other organic compounds may be incorporated into the aqueous base fluid to control the density of the water-based drilling fluid. Increasing the saturation of the aqueous base fluid by increasing the salt concentration or the level of other organic compounds in the aqueous base fluid may increase the density of the water-based drilling fluid. Suitable salts include but are not limited to alkali metal chlorides, hydroxides, or carboxylates. For example, in embodiments the aqueous base fluid may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, or combinations of these.

In embodiments, the water-based drilling fluid may include an aqueous base fluid in an amount of from 50 $lb_m$/bbl to 340 $lb_m$/bbl relative to the total volume of the water-based drilling fluid. For example, the water-based drilling fluid may include an aqueous base fluid in an amount of from 50 $lb_m$/bbl to 300 $lb_m$/bbl, from 50 $lb_m$/bbl to 250 $lb_m$/bbl, from 50 $lb_m$/bbl to 200 $lb_m$/bbl, from 50 $lb_m$/bbl to 150 $lb_m$/bbl, from 50 $lb_m$/bbl to 100 $lb_m$/bbl, from 100 $lb_m$/bbl to 340 $lb_m$/bbl, from 100 $lb_m$/bbl to 300 $lb_m$/bbl, from 100 $lb_m$/bbl to 250 $lb_m$/bbl, from 100 $lb_m$/bbl to 200 $lb_m$/bbl, from 100 $lb_m$/bbl to 150 $lb_m$/bbl, from 150 $lb_m$/bbl to 340 $lb_m$/bbl, from 150 $lb_m$/bbl to 300 $lb_m$/bbl, from 150 $lb_m$/bbl to 250 $lb_m$/bbl, from 150 $lb_m$/bbl to 200 $lb_m$/bbl, from 200 $lb_m$/bbl to 340 $lb_m$/bbl, from 200 $lb_m$/bbl to 300 $lb_m$/bbl, from 200 $lb_m$/bbl to 250 $lb_m$/bbl, from 250 $lb_m$/bbl to 340 $lb_m$/bbl, from 250 $lb_m$/bbl to 300 $lb_m$/bbl, or from 300 $lb_m$/bbl to 340 $lb_m$/bbl relative to the total volume of the water-based drilling fluid.

As stated previously in the present disclosure, the water-based drilling fluid may include a mixture of polyethylene polyamines. As presently described, the mixture of polyethylene polyamines may include a substantial portion of or all of the polyethylene polyamines in the water-based drilling fluid into which the mixture of polyethylene polyamines may be incorporated. For example, the mixture of polyethylene polyamines may include greater than or equal to 90 percent (%), greater than or equal to 95%, greater than or equal to 99%, or greater than or equal to 99.9% of the polyethylene polyamines in the water-based drilling fluid into which the mixture of polyethylene polyamines may be incorporated. The mixture of polyethylene polyamines may reduce or prevent the swelling of clay particles present in subterranean formations and the hydration of the subterranean formations. Without being bound by any particular theory, it is believed that the polyethylene polyamines are adsorbed onto the surfaces of the clay particles due to intermolecular interactions, such as hydrogen bonding and Van der Waals forces, between the surfaces of the clay particles and the amine moieties of the polyethylene polyamines. This adsorption may create a film or layer of polyethylene polyamines on the surfaces of the clay particles that prevents interactions between the clay particles and the aqueous base fluid of the water-based drilling fluid that may cause swelling of the clay particles and the hydration of the subterranean formation.

In embodiments, the mixture of polyethylene polyamines may include linear polyethylene polyamines, cyclic polyethylene polyamines, branched polyethylene polyamines, or combinations of these. Generally, the polyethylene polyamines of the mixture may have the chemical structure of Formula (I):

$$H_2NCH_2CH_2(NHCH_2CH_2)_xNH_2 \qquad \text{Formula (I)}$$

In Formula (I), x may be an integer greater than or equal to 3. In embodiments, x may be an integer greater than or equal to 4, greater than or equal to 5, greater than or equal to 6, greater than or equal to 7, greater than or equal to 8, greater than or equal to 9, greater than or equal to 10. In embodiments, x may be an integer from 3 to 10, from 3 to 9, from 3 to 8, from 3 to 7, from 3 to 6, from 3 to 5, from 3 to 4, from 4 to 10, from 4 to 9, from 4 to 8, from 4 to 7, from 4 to 6, from 4 to 5, from 5 to 10, from 5 to 9, from 5 to 8, from 5 to 7, from 5 to 6, from 6 to 10, from 6 to 9, from 6 to 8, from 6 to 7, from 7 to 10, from 7 to 9, from 7 to 8, from 8 to 10, from 8 to 9, or from 9 to 10. The $(NHCH_2CH_2)_x$ moiety of Formula (I) may include cyclic moieties, branched moieties, or combinations of these. Without being bound by any particular theory, it is believed that a greater number of $(NHCH_2CH_2)_x$ moieties may result in a greater reduction in the hydration of the subterranean formation due to a greater concentration of amine moieties in the water-based drilling fluid that may interact with the surface of the clay particles.

In embodiments, the mixture of polyethylene polyamines may have an average molecular weight sufficient to create a film or layer on the surfaces of clay particles present in subterranean formations. In embodiments, the mixture of polyethylene polyamines may have an average molecular weight of from 200 g/mol to 400 g/mol. For example, the mixture of polyethylene polyamines may have an average molecular weight of from 200 g/mol to 375 g/mol, from 200 g/mol to 350 g/mol, from 200 g/mol to 325 g/mol, from 200 g/mol to 300 g/mol, from 200 g/mol to 275 g/mol, from 200 g/mol to 250 g/mol, from 200 g/mol to 225 g/mol, from 225 g/mol to 400 g/mol, from 225 g/mol to 375 g/mol, from 225 g/mol to 350 g/mol, from 225 g/mol to 325 g/mol, from 225 g/mol to 300 g/mol, from 225 g/mol to 275 g/mol, from 225 g/mol to 250 g/mol, from 250 g/mol to 400 g/mol, from 250 g/mol to 375 g/mol, from 250 g/mol to 350 g/mol, from 250 g/mol to 325 g/mol, from 250 g/mol to 300 g/mol, from 250 g/mol to 275 g/mol, from 275 g/mol to 400 g/mol, from 275 g/mol to 375 g/mol, from 275 g/mol to 350 g/mol, from 275 g/mol to 325 g/mol, from 275 g/mol to 300 g/mol, from 300 g/mol to 400 g/mol, from 300 g/mol to 375 g/mol, from 300 g/mol to 350 g/mol, from 300 g/mol to 325 g/mol, from 325 g/mol to 400 g/mol, from 325 g/mol to 375 g/mol, from 325 g/mol to 350 g/mol, from 350 g/mol to 400 g/mol, from 350 g/mol to 375 g/mol, or from 375 g/mol to 400 g/mol. When the mixture of polyethylene polyamines has an average molecular weight less than 200 g/mol, the mixture of polyethylene polyamines may not create a film or layer over the entire surface of the clay particles present in the subterranean formation. Without being bound by any particular theory, it is believed that smaller polyethylene polyamines, for example, polyethylene polyamines having an average molecular weight less than 200 g/mol, may not be large enough to adequately cover the entire surface of the clay particles. This may allow interaction between the clay particles and the aqueous base fluid of the water-based drilling fluid, which may result in the swelling of the clay particles and the hydration of the subterranean formation.

In embodiments the mixture of polyethylene polyamines may include tetraethlyenepentamine, pentaethylenehexamine, hexaethyleneheptamine, or combinations of these. In embodiments, the weight percent (wt. %) of the tetraethlyenepentamine may be at least 10 wt. % of the mixture of polyethylene polyamines. For example, the weight percent of the tetraethlyenepentamine may be at least 20 wt. %, at least 30 wt. %, at least 40 wt. %, at least 50 wt. %, at least 60 wt. %, at least 70 wt. %, at least 80 wt. %, or at least 90 wt. % of the mixture of polyethylene polyamines. In embodiments, the weight percent of the pentaethylenehexamine may be at least 10 wt. % of the mixture of polyethylene polyamines. For example, the weight percent of the pentaethylenehexamine may be at least 20 wt. %, at least 30 wt. %, at least 40 wt. %, at least 50 wt. %, at least 60 wt. %, at least 70 wt. %, at least 80 wt. %, or at least 90 wt. % of the mixture of polyethylene polyamines. In embodiments, the weight percent of the hexaethyleneheptamine may be at least 10 wt. % of the mixture of polyethylene polyamines. For example, the weight percent of the hexaethyleneheptamine may be at least 20 wt. %, at least 30 wt. %, at least 40 wt. %, at least 50 wt. %, at least 60 wt. %, at least 70 wt. %, at least 80 wt. %, or at least 90 wt. % of the mixture of polyethylene polyamines. In embodiments, tetraethlyenepentamine, pentaethylenehexamine, hexaethyleneheptamine, or combinations of these may be the majority of the mixture of polyethylene polyamines. In embodiments, the sum of the weight percent of the tetraethlyenepentamine, pentaethylenehexamine, and hexaethyleneheptamine may be at least 50 wt. % of the mixture of polyethylene polyamines. For example, the sum of the weight percent of the tetraethlyenepentamine, pentaethylenehexamine, and hexaethyleneheptamine may be at least 60 wt. %, at least 70 wt. %, at least 80 wt. %, at least 90 wt. %, at least 95 wt. %, or at least 99 wt. % of the mixture of polyethylene polyamines.

The water-based drilling fluid may include a mixture of polyethylene polyamines in an amount sufficient to effectively reduce or prevent the hydration of the subterranean formation. In embodiments, the water-based drilling fluid may include a mixture of polyethylene polyamines in an amount of from 1 $lb_m$/bbl to 20 $lb_m$/bbl relative to the total volume of the water-based drilling fluid. For example, the water-based drilling fluid may include an aqueous base fluid in an amount of from 1 $lb_m$/bbl to 16 $lb_m$/bbl, from 1 $lb_m$/bbl to 12 $lb_m$/bbl, from 1 $lb_m$/bbl to 8 $lb_m$/bbl, from 1 $lb_m$/bbl to 4 $lb_m$/bbl, from 4 $lb_m$/bbl to 20 $lb_m$/bbl, from 4 $lb_m$/bbl to 16 $lb_m$/bbl, from 4 $lb_m$/bbl to 12 $lb_m$/bbl, from 4 $lb_m$/bbl to 8 $lb_m$/bbl, from 8 $lb_m$/bbl to 20 $lb_m$/bbl, from 8 $lb_m$/bbl to 16 $lb_m$/bbl, from 8 $lb_m$/bbl to 12 $lb_m$/bbl, from 12 $lb_m$/bbl to 20 $lb_m$/bbl, from 12 $lb_m$/bbl to 16 $lb_m$/bbl, or from 16 $lb_m$/bbl to 20 $lb_m$/bbl relative to the total volume of the water-based drilling fluid.

As stated previously in the present disclosure, the hydration of the subterranean formation may lead to an increase in fines in the water-based drilling fluid, which negatively affect the rheology of the water-based drilling fluid. Accordingly, without being bound by any particular theory, it is believed that the effectiveness of a water-based drilling fluid at suppressing the hydration of a subterranean formation may be measured by the rheology of the water-based drilling fluid. The rheological properties of the water-based drilling fluid, such as plastic viscosity, yield point, and gel strength, may be determined from measurements of the viscosity, shear stress, and shear rate of the water-based drilling fluid.

The rheological properties of the water-based drilling fluid may be determined by measuring the shear stress on the water-based drilling fluid at different shear rates. The various shear rates are utilized since water-based drilling fluids behave as a rigid body at lesser shear stresses but flow as a viscous fluid at greater shear stresses. The rheology of the water-based drilling fluid may be characterized by the plastic viscosity (PV) and the yield point (YP), which are parameters from the Bingham plastic rheology model. The plastic viscosity is related to the resistance of a water-based drilling fluid to flow due to mechanical interaction between solids, such as fines, in the water-based drilling fluid. The plastic viscosity represents the viscosity of the water-based drilling fluid extrapolated to infinite shear rate. The plastic viscosity is expressed in centipoise (cP). The plastic viscosity reflects the type and concentration of the solids in the hydraulic fracturing fluid. The plastic viscosity of a water-based drilling fluid may be estimated by measuring the shear stress of the water-based drilling fluid using the a rheometer at spindle speeds of 300 rotations per minute (rpm) and 600 rpm and subtracting the 300 rpm dial reading from the 600 rpm dial reading according to Equation (I):

$$PV(cP)=(\text{Dial Reading at 600 rpm})-(\text{Dial Reading at 300 rpm}) \quad \text{Equation (I)}$$

In embodiments, the water-based drilling fluid may have a plastic viscosity of from 1 cP to 25 cP. For example, the water-based drilling fluid may have a plastic viscosity of from 1 cP to 20 cP, from 1 cP to 15 cP, from 1 cP to 10 cP, from 1 cP to 5 cP, from 5 cP to 25 cP, from 5 cP to 20 cP, from 5 cP to 15 cP, from 5 cP to 10 cP, from 10 cP to 25 cP, from 10 cP to 20 cP, from 10 cP to 15 cP, from 15 cP to 25 cP, from 15 cP to 20 cP, or from 20 cP to 25 cP. In embodiments, the mixture of polyethylene polyamines may decrease the plastic viscosity of the water-based drilling fluid when compared to a similar or equivalent water-based fluid without the mixture of polyethylene polyamines by greater than or equal to 10%. For example, the mixture of polyethylene polyamines may decrease the plastic viscosity of the water-based drilling fluid when compared to a similar or equivalent water-based fluid without the mixture of polyethylene polyamines by greater than or equal to 20%, greater than or equal to 30%, greater than or equal to 40%, greater than or equal to 50%, greater than or equal to 60%, greater than or equal to 70%, greater than or equal to 80%, greater than or equal to 90%, greater than or equal to 100%, greater than or equal to 200%, greater than or equal to 250%, or greater than or equal to 500%.

Water-based drilling fluids may behave as a rigid body when the shear stress is less than the yield point, and water-based drilling fluids may flow as a viscous fluid when the shear stress is greater than the yield point. In other words, the yield point represents the amount of stress required to move the hydraulic fracturing fluid from a static condition. The yield point of a water-based drilling fluid is expressed as a force per area, such as pounds per one hundred square feet ($lb_f/100$ $ft^2$). Yield point provides an indication of the ability of a water-based drilling fluid to carry solids, such as cuttings through the annulus, which, in simplified terms, gives an indication of the ability of a water-based drilling fluid to lift cuttings away from the bottom of the subterranean formation. The yield point of a water-based drilling fluid is determined by extrapolating the Bingham plastic rheology model to a shear rate of zero. The yield point of a water-based drilling fluid may be estimated from the plastic viscosity of the water-based drilling fluid (as measured in accordance with Equation 2, as previously described) according to Equation (II):

$$YP=(\text{Dial Reading at 300 rpm})-PV \quad \text{Equation (II)}$$

In embodiments, the water-based drilling fluid may have a yield point of from 1 $lb_f/100$ $ft^2$ to 25 $lb_f/100$ $ft^2$. For example, the water-based drilling fluid may have a yield point of from 1 $lb_f/100$ $ft^2$ to 20 $lb_f/100$ $ft^2$, from 1 $lb_f/100$ $ft^2$ to 15 $lb_f/100$ $ft^2$, from 1 $lb_f/100$ $ft^2$ to 10 $lb_f/100$ $ft^2$, from 1 $lb_f/100$ $ft^2$ to 5 $lb_f/100$ $ft^2$, from 5 $lb_f/100$ $ft^2$ to 25 $lb_f/100$ $ft^2$, from 5 $lb_f/100$ $ft^2$ to 20 $lb_f/100$ $ft^2$, from 5 $lb_f/100$ $ft^2$ to 15 $lb_f/100$ $ft^2$, from 5 $lb_f/100$ $ft^2$ to 10 $lb_f/100$ $ft^2$, from 10 $lb_f/100$ $ft^2$ to 25 $lb_f/100$ $ft^2$, from 10 $lb_f/100$ $ft^2$ to 20 $lb_f/100$ $ft^2$, from 10 $lb_f/100$ $ft^2$ to 15 $lb_f/100$ $ft^2$, from 15 $lb_f/100$ $ft^2$ to 25 $lb_f/100$ $ft^2$, from 15 $lb_f/100$ $ft^2$ to 20 $lb_f/100$ $ft^2$, or from 20 $lb_f/100$ $ft^2$ to 25 $lb_f/100$ $ft^2$. In embodiments, the mixture of polyethylene polyamines may decrease the yield point of the water-based drilling fluid when compared to a similar or equivalent water-based fluid without the mixture of polyethylene polyamines by greater than or equal to 10%. For example, the mixture of polyethylene polyamines may decrease the yield point of the water-based drilling fluid when compared to a similar or equivalent water-based fluid without the mixture of polyethylene polyamines by greater than or equal to 20%, greater than or equal to 30%, greater than or equal to 40%, greater than or equal to 50%, greater than or equal to 60%, greater than or equal to 70%, greater than or equal to 80%, greater than or equal to 90%, greater than or equal to 100%, greater than or equal to 200%, greater than or equal to 250%, or greater than or equal to 500%.

The gel strength of a water-based drilling fluid refers to the shear stress of the water-based drilling fluid measured at a shear rate less than 10 rpm following a defined period of time during which the water-based drilling fluid is maintained in a static state. In embodiments, the water-based drilling fluid may have a gel strength after 10 seconds of from 1 $lb_f/100$ $ft^2$ to 15 $lb_f/100$ $ft^2$. For example, the water-based drilling fluid may have a gel strength after 10 seconds of from 1 $lb_f/100$ $ft^2$ to 12 $lb_f/100$ $ft^2$, from 1 $lb_f/100$ $ft^2$ to 9 $lb_f/100$ $ft^2$, from 1 $lb_f/100$ $ft^2$ to 6 $lb_f/100$ $ft^2$, from 1 $lb_f/100$ $ft^2$ to 3 $lb_f/100$ $ft^2$, from 3 $lb_f/100$ $ft^2$ to 15 $lb_f/100$ $ft^2$, from 3 $lb_f/100$ $ft^2$ to 12 $lb_f/100$ $ft^2$, from 3 $lb_f/100$ $ft^2$ to 9 $lb_f/100$ $ft^2$, from 3 $lb_f/100$ $ft^2$ to 6 $lb_f/100$ $ft^2$, from 6 $lb_f/100$ $ft^2$ to 15 $lb_f/100$ $ft^2$, from 6 $lb_f/100$ $ft^2$ to 12 $lb_f/100$ $ft^2$, from 6 $lb_f/100$ $ft^2$ to 9 $lb_f/100$ $ft^2$, from 9 $lb_f/100$ $ft^2$ to 15 $lb_f/100$ $ft^2$, from 9 $lb_f/100$ $ft^2$ to 12 $lb_f/100$ $ft^2$, or from 12 $lb_f/100$ $ft^2$ to 15 $lb_f/100$ $ft^2$. In embodiments, the mixture of polyethylene polyamines may decrease the 10-second gel strength of the water-based drilling fluid when compared to a similar or equivalent water-based fluid without the mixture of polyethylene polyamines by greater than or equal to 10%. For example, the mixture of polyethylene polyamines may decrease the 10-second gel strength of the water-based drilling fluid when compared to a similar or equivalent water-based fluid without the mixture of polyethylene polyamines by greater than or equal to 20%, greater than or equal to 30%, greater than or equal to 40%, greater than or equal to 50%, greater than or equal to 60%, greater than or equal to 70%, greater than or equal to 80%, greater than or equal to 90%, greater than or equal to 100%, greater than or equal to 200%, greater than or equal to 250%, or greater than or equal to 500%.

In embodiments, the water-based drilling fluid may have a gel strength after 10 minutes of from 1 $lb_f/100$ $ft^2$ to 25 $lb_f/100$ $ft^2$. For example, the water-based drilling fluid may have a gel strength after 10 minutes of from 1 $lb_f/100$ $ft^2$ to 20 $lb_f/100$ $ft^2$, from 1 $lb_f/100$ $ft^2$ to 15 $lb_f/100$ $ft^2$, from 1 $lb_f/100$ $ft^2$ to 10 $lb_f/100$ $ft^2$, from 1 $lb_f/100$ $ft^2$ to 5 $lb_f/100$ $ft^2$, from 5 $lb_f/100$ $ft^2$ to 25 $lb_f/100$ $ft^2$, from 5 $lb_f/100$ $ft^2$ to 20 $lb_f/100$ $ft^2$, from 5 $lb_f/100$ $ft^2$ to 15 $lb_f/100$ $ft^2$, from 5 $lb_f/100$ $ft^2$ to 10 $lb_f/100$ $ft^2$, from 10 $lb_f/100$ $ft^2$ to 25 $lb_f/100$ $ft^2$, from 10 $lb_f/100$ $ft^2$ to 20 $lb_f/100$ $ft^2$, from 10 $lb_f/100$ $ft^2$ to 15 $lb_f/100$ $ft^2$, from 15 $lb_f/100$ $ft^2$ to 25 $lb_f/100$ $ft^2$, from 15 $lb_f/100$ $ft^2$ to 20 $lb_f/100$ $ft^2$, or from 20 $lb_f/100$ $ft^2$ to 25 $lb_f/100$ $ft^2$. In embodiments, the mixture of polyethylene polyamines may decrease the 10-minute gel strength of the water-based drilling fluid when compared to a similar or equivalent water-based fluid without the mixture of polyethylene polyamines by greater than or equal to 10%. For example, the mixture of polyethylene polyamines may decrease the 10-minute gel strength of the water-based drilling fluid when compared to a similar or equivalent water-based fluid without the mixture of polyethylene polyamines by greater than or equal to 20%, greater than or equal to 30%, greater than or equal to 40%, greater than or equal to 50%, greater than or equal to 60%, greater than or equal to 70%, greater than or equal to 80%, greater than or equal to 90%, greater than or equal to 100%, greater than or equal to 200%, greater than or equal to 250%, or greater than or equal to 500%.

In embodiments, the water-based drilling fluid may be formulated to have specific characteristics, such as increased viscosity and density. For example, the water-based drilling fluid may be formulated to have a density in a range suitable to provide the necessary hydrostatic pressure to support the sidewalls of the wellbore and prevent fluids in the formation from flowing into the wellbore. Additionally, the water-based drilling fluid may be formulated to have viscosity in a range suitable to allow the water-based drilling fluid to be pumped down through the drill string while still capturing and conveying cuttings from the bottom of the subterranean formation. To accomplish these functions, the water-based drilling fluid may include one or more additives that are suitable for use in water-based drilling fluids. The one or more additive may include viscosifiers, fluid loss control agents, weighting agents, bridging agents, or combinations of these.

As noted previously in the present disclosure, in embodiments the water-based drilling fluid may include a viscosifier, also referred to as a rheology modifier. Viscosifiers may impart non-Newtonian fluid rheology to the water-based drilling fluid, create a flat viscosity profile of the water-based drilling fluid in annular flow, or both. This may facilitate the lifting and conveying of cuttings from the bottom of the subterranean formation to the surface during drilling of the subterranean well. In embodiments, the viscosifier may include polysaccharides, bentonite, polyacrylamides, polyanionic cellulose, or combinations of these. For example, the viscosifier may include xanthan gum, a polysaccharide also referred to as "XC polymer." The water-based drilling fluid may include a viscosifier in an amount sufficient to impart non-Newtonian fluid rheology to the water-based drilling fluid, create a flat viscosity profile of the water-based drilling fluid in annular flow, or both. In embodiments, the water-based drilling fluid may include a viscosifier in an amount of from 0.01 $lb_m$/bbl to 5 $lb_m$/bbl relative to the total volume of the water-based drilling fluid. For example, the water-based drilling fluid may include a viscosifier in an amount of from 0.01 $lb_m$/bbl to 4 $lb_m$/bbl, from 0.01 $lb_m$/bbl to 3 $lb_m$/bbl, from 0.01 $lb_m$/bbl to 2 $lb_m$/bbl, from 0.01 $lb_m$/bbl to 1 $lb_m$/bbl, from 0.01 $lb_m$/bbl to 0.5 $lb_m$/bbl, from 0.5 $lb_m$/bbl to 5 $lb_m$/bbl, from 0.5 $lb_m$/bbl to 4 $lb_m$/bbl, from 0.5 $lb_m$/bbl to 3 $lb_m$/bbl, from 0.5 $lb_m$/bbl to 2 $lb_m$/bbl, from 0.5 $lb_m$/bbl to 1 $lb_m$/bbl, from 1 $lb_m$/bbl to 5 $lb_m$/bbl, from 1 $lb_m$/bbl to 4 $lb_m$/bbl, from 1 $lb_m$/bbl to 3 $lb_m$/bbl, from 1 $lb_m$/bbl to 2 $lb_m$/bbl, from 2 $lb_m$/bbl to 5 $lb_m$/bbl, from 2 $lb_m$/bbl to 4 $lb_m$/bbl, from 2 $lb_m$/bbl to 3 $lb_m$/bbl, from 3 $lb_m$/bbl to 5 $lb_m$/bbl, from 3 $lb_m$/bbl to 4 $lb_m$/bbl, or from 4 $lb_m$/bbl to 5 $lb_m$/bbl relative to the total volume of the water-based drilling fluid.

As noted previously in the present disclosure, in embodiments the water-based drilling fluid may include a fluid loss control agent. Fluid loss control agents may reduce or prevent the leakage of the liquid phase of the water-based drilling fluid into the subterranean formation. This leakage may result in an undesirable buildup of solid material present in the water-based drilling fluid, damage to the subterranean formation, or both. In embodiments, the fluid loss control agent may include starch, carboxymethyl starch, carboxymethylcellulose, or combinations of these. The water-based drilling fluid may include a fluid loss control agent in an amount sufficient to reduce or prevent the leakage of the liquid phase of the water-based drilling fluid into the subterranean formation. In embodiments, the water-based drilling fluid may include a fluid loss control agent in an amount of from 0.1 $lb_m$/bbl to 10 $lb_m$/bbl relative to the total volume of the water-based drilling fluid. For example, the water-based drilling fluid may include a fluid loss control agent in an amount of from 0.1 $lb_m$/bbl to 7.5 $lb_m$/bbl, from 0.1 $lb_m$/bbl to 5 $lb_m$/bbl, from 0.1 $lb_m$/bbl to 2.5 $lb_m$/bbl, from 0.1 $lb_m$/bbl to 1 $lb_m$/bbl, from 1 $lb_m$/bbl to 10 $lb_m$/bbl, from 1 $lb_m$/bbl to 7.5 $lb_m$/bbl, from 1 $lb_m$/bbl to 5 $lb_m$/bbl, from 1 $lb_m$/bbl to 2.5 $lb_m$/bbl, from 2.5 $lb_m$/bbl to 10 $lb_m$/bbl, from 2.5 $lb_m$/bbl to 7.5 $lb_m$/bbl, from 2.5 $lb_m$/bbl to 5 $lb_m$/bbl, from 5 $lb_m$/bbl to 10 $lb_m$/bbl, from 5 $lb_m$/bbl to 7.5 $lb_m$/bbl, or from 7.5 $lb_m$/bbl to 10 $lb_m$/bbl relative to the total volume of the water-based drilling fluid.

As noted previously in the present disclosure, in embodiments the water-based drilling fluid may include a weighting agent. Weighting agents may include finely divided solid particles that may be dispersed in the water-based drilling fluid. Weighting agents may increase the density of the water-based drilling fluid to support the sidewalls of the wellbore. Weighting agents may also increase the hydrostatic pressure of the water-based drilling fluid to reduce or prevent fluids present in the subterranean formation from flowing into the wellbore. In embodiments, the weighting agent may include barite, hematite, calcium carbonate, siderite, ilmenite, or combinations of these. In embodiments, the water-based drilling fluid may include a weighting agent in an amount sufficient for the water-based drilling fluid to achieve a density of from 50 pounds per cubic foot (pcf) to 150 pcf, as measured in accordance with the American Petroleum Institute (API) recommended practice 13B-1. For example, the water-based drilling fluid may include a weighting agent in an amount sufficient for the water-based drilling fluid to achieve a density of from 50 pcf to 125 pcf, from 50 pcf to 100 pcf, from 50 pcf to 75 pcf, from 75 pcf to 150 pcf, from 75 pcf to 125 pcf, from 75 pcf to 100 pcf, from 100 pcf to 150 pcf, from 100 pcf to 125 pcf, or from 125 pcf to 150 pcf. In embodiments, the water-based drilling fluid may include a weighting agent in an amount of from 1 $lb_m$/bbl to 200 $lb_m$/bbl relative to the total volume of the water-based drilling fluid. For example, the water-based drilling fluid may include a weighting agent in an amount of from 1 $lb_m$/bbl to 150 $lb_m$/bbl, from 1 $lb_m$/bbl to 100 $lb_m$/bbl, from 1 $lb_m$/bbl to 50 $lb_m$/bbl, from 50 $lb_m$/bbl to 200 $lb_m$/bbl, from 50 $lb_m$/bbl to 150 $lb_m$/bbl, from 50 $lb_m$/bbl to 100 $lb_m$/bbl, from 100 $lb_m$/bbl to 200 $lb_m$/bbl, from 100 $lb_m$/bbl to 150 $lb_m$/bbl, or from 150 $lb_m$/bbl to 200 $lb_m$/bbl relative to the total volume of the water-based drilling fluid.

As noted previously in the present disclosure, in embodiments the water-based drilling fluid may include a bridging agent. Bridging agents may include solids that bridge across the pore throats or fractures present in the subterranean formation, and reduce or prevent the leakage of the liquid phase of the water-based drilling fluid into the subterranean formation. In embodiments, the bridging agent may include calcium carbonate, suspended salts, oil-soluble-resins, or combinations of these. The bridging agent may be selected based on the average size of the particles, which may be determined with regard to the properties of the subterranean formation. For example, the bridging agent may include calcium carbonate with an average particle size of 50 microns, calcium carbonate with an average particle size of 25 microns, or both. In embodiments, the water-based drilling fluid may include a bridging agent in an amount sufficient to reduce or prevent the leakage of the liquid phase of the water-based drilling fluid into the subterranean formation. In embodiments, the water-based drilling fluid may include a bridging agent in an amount of from 0.1 $lb_m$/bbl to 20 $lb_m$/bbl relative to the total volume of the water-based drilling fluid. For example, the water-based drilling fluid may include a bridging agent in an amount of from 0.1 $lb_m$/bbl to 15 $lb_m$/bbl, from 0.1 $lb_m$/bbl to 10 $lb_m$/bbl, from 0.1 $lb_m$/bbl to 5 $lb_m$/bbl, from 0.1 $lb_m$/bbl to 1 $lb_m$/bbl, from 1 $lb_m$/bbl to 20 $lb_m$/bbl, from 1 $lb_m$/bbl to 15 $lb_m$/bbl, from 1 $lb_m$/bbl to 10 $lb_m$/bbl, from 1 $lb_m$/bbl to 5 $lb_m$/bbl, from 5 $lb_m$/bbl to 20 $lb_m$/bbl, from 5 $lb_m$/bbl to 15 $lb_m$/bbl, from 5 $lb_m$/bbl to 10 $lb_m$/bbl, from 10 $lb_m$/bbl to 20 $lb_m$/bbl, from 10 $lb_m$/bbl to 15 $lb_m$/bbl, or from 15 $lb_m$/bbl to 20 $lb_m$/bbl relative to the total volume of the water-based drilling fluid.

The present disclosure is also directed to the use of the water-based drilling fluid in drilling operations, such as drilling a subterranean well. Accordingly, methods for drilling a subterranean well may include operating a drill in a subterranean formation in the presence of a water-based drilling fluid. The water-based drilling fluid may be in accordance with any of the embodiments previously described. In embodiments, the water-based drilling fluid may be introduced into the subterranean formation. Introducing may involve injecting the drilling fluid into the subterranean formation. In embodiments, the drilling fluid may be injected through a drill string of the drill to a drill bit. In embodiments, the subterranean formation may be a subterranean well. In embodiments, the subterranean formation may be a shale formation. The water-based drilling fluid may at least be partially circulated within the subterranean formation. Recirculating the water-based drilling fluid may allow the water-based drilling fluid to cool and lubricate the drill bit and to lift cuttings away from the drill bit, carrying the cuttings upwards to the surface to clean the wellbore. The water-based drilling fluid may additionally provide hydrostatic pressure to support the sidewalls of the wellbore and prevent the sidewalls from collapsing onto the drill string.

EXAMPLES

The various embodiments of water-based drilling fluid compositions will be further clarified by the following examples. The examples are illustrative in nature, and should not be understood to limit the subject matter of the present disclosure.

Example 1—Hydration Suppression Testing

To observe the effects of the presently disclosed water-based drilling fluid in reducing or preventing the hydration of subterranean formations, a hydration suppression test was performed using bentonite clay. As bentonite clay is susceptible to swelling, similar to the clay particles present in a shale formation, the volume of bentonite clay will increase when exposed to a water-based drilling fluid and, as a result, the viscosity of the water-based drilling fluid will increase. Therefore, as stated previously, the ability of a water-based drilling fluid to reduce or prevent the hydration of a subterranean formation may be measured by the rheology of the water-based drilling fluid after exposure to bentonite clay.

In this regard, four different water-based drilling fluid samples were prepared. The first sample (Comparative Sample A) included only 350 grams (g) of water. Samples 1-3 were each prepared by first mixing 350 g of water with 1 g of a mixture of polyethylene polyamines, 5 g of a mixture of polyethylene polyamines, and 10 g of a mixture of polyethylene polyamines, respectively, for 5 minutes. The mixture of polyethylene polyamines incorporated into Samples 1-3 was ETHYLENEAMINE E-100 obtained from Huntsman (Texas, United States of America). ETHYLENEAMINE E-100 is a mixture of polyethylene polyamines having an average molecular weight of 250 g/mol to 300 g/mol. The resulting samples included the mixture of polyethylene polyamines in concentrations of approximately 1 $lb_m$/bbl (Sample 1), 5 $lb_m$/bbl (Sample 2), and 10 $lb_m$/bbl (Sample 3). Each sample was then mixed with 30 g of drilling grade bentonite for 20 minutes. After mixing, the samples were each hot rolled at 150 degrees Fahrenheit (° F.) for 16 hours. After hot rolling, the rheology of each sample was measured using a rheometer as described previously. The rheology of each sample was measured twice, once at room temperature (RT) and once at 120° F., using a viscometer (commercially available as Model 35 from Fann Instrument Company). The composition and rheology of each sample are listed in Table 1.

TABLE 1

| Hydration Suppression Testing of Water-Based Drilling Fluids | | | | | | | | |
|---|---|---|---|---|---|---|---|---|
| | Comparative Sample A | | Sample 1 | | Sample 2 | | Sample 3 | |
| Composition | | | | | | | | |
| Water (g) | 350 | | 350 | | 350 | | 350 | |
| Mixture of Polyethylene Polyamines (g) | — | | 1 | | 5 | | 10 | |
| Bentonite (g) | 30 | | 30 | | 30 | | 30 | |
| Rheology | | | | | | | | |
| | RT | 120° F. | RT | 120° F. | RT | 120° F. | RT | 120° F. |
| 600 rpm | 112 | 95 | 31 | 24 | 22 | 17 | 20 | 15 |
| 300 rpm | 73 | 67 | 20 | 16 | 12 | 9 | 12 | 10 |
| 200 rpm | 62 | 54 | 15 | 13 | 8 | 7 | 9 | 8 |
| 100 rpm | 44 | 34 | 11 | 9 | 4 | 4 | 7 | 6 |
| 6 rpm | 14 | 12 | 6 | 4 | 3 | 2 | 5 | 4 |
| 3 rpm | 11 | 10 | 4 | 3 | 2 | 1 | 4 | 4 |
| PV (cP) | 39 | 28 | 11 | 8 | 10 | 8 | 8 | 5 |
| YP ($lb_f$/100ft$^2$) | 34 | 39 | 9 | 8 | 2 | 1 | 4 | 5 |
| 10-Second Gel Strength ($lb_f$/100ft$^2$) | 13 | 13 | 8 | 4 | 4 | 3 | 5 | 4 |
| 10-Minute Gel Strength ($lb_f$/100ft$^2$) | 41 | 44 | 12 | 5 | 7 | 7 | 10 | 9 |

As shown by Table 1, water-based drilling fluids that include a mixture of polyethylene polyamines are capable of maintaining a lesser plastic viscosity, yield point, 10-second gel strength, and 10-minute gel strength when compared to a water-based drilling fluid that does not include the polyethylene polyamines of the present disclosure. This indicates that water-based drilling fluids of the present disclosure may be capable of reducing or preventing the hydration of subterranean formations. In particular, the mixture of polyethylene polyamines prevented the bentonite clay from swelling when in contact with the water-based drilling fluid and, as a result, prevented an increase in rheological properties, such as plastic viscosity, of the water-based drilling fluid.

Example 2—Comparison of Polyethylene Polyamine Mixtures

To compare the effects of different mixtures of polyethylene polyamines, a hydration suppression test was performed using bentonite clay, as detailed in Example 1. Comparative Sample B and Comparative Sample C were each prepared by first mixing 350 g of water with 1 g of tetraethylenepentamine (commercially available from Huntsman Corporation) and 5 g of tetraethylenepentamine, respectively, for 5 minutes. After mixing, Comparative Sample B and Comparative Sample C were each hot rolled at 150° F. for 16 hours. After hot rolling, the rheology of both Comparative Sample B and Comparative Sample C was measured using a rheometer as described previously. The rheology of both Comparative Sample B and Comparative Sample C was measured twice, once at room temperature (RT) and once at 120° F., using a viscometer (commercially available as Model 35 from Fann Instrument Company). The composition and rheology of both Comparative Sample B and Comparative Sample C as well as Sample 1-3 of Example 1 are listed in Table 2.

As shown by Table 2, water-based drilling fluids that include a mixture of polyethylene polyamines having an average molecular weight of 250 g/mol to 300 g/mol are capable of maintaining a similar or lesser plastic viscosity, yield point, 10-second gel strength, and 10-minute gel strength when compared to a water-based drilling fluid that included only tetraethylenepentamine. This indicates that water-based drilling fluids that include mixtures of polyethylene polyamines having a greater average molecular weight when compared to other mixtures of polyethylene polyamines are capable of a greater reduction of the hydration of subterranean formations.

Example 3—Formulation of Water-Based Drilling Fluid

A water-based drilling fluid having a density of 90 pcf was formulated based on the measurements of Example 1. The water-based drilling fluid was prepared by mixing the components, as listed in Table 3. After mixing, the water-based drilling fluid was hot rolled at 150° F. for 16 hours. After hot rolling, the rheology of the water-based drilling was measured at 120° F. using a rheometer as described previously. The composition and rheology of the water-based drilling fluid are listed in Table 3.

TABLE 3

Composition and Rheology of Water-Based Drilling Fluid

| Composition | |
| --- | --- |
| Water ($lb_m$/bbl) | 273.2 |
| XC Polymer ($lb_m$/bbl) | 0.75 |
| Starch ($lb_m$/bbl) | 4 |
| NaCl ($lb_m$/bbl) | 58 |
| NaOH (lbm/bbl) | 0.5 |
| Barite ($lb_m$/bbl) | 142.6 |
| $CaCO_3$ - 50 Microns ($lb_m$/bbl) | 10 |
| $CaCO_3$ - 25 Microns ($lb_m$/bbl) | 10 |
| Polyethylene Polyamines ($lb_m$/bbl) | 5 |

TABLE 2

Hydration Suppression Testing of Polyethylene Polyamine Mixtures

| | Sample 1 | | Sample 2 | | Sample 3 | | Comparative Sample B | | Comparative Sample C | |
| --- | --- | --- | --- | --- | --- | --- | --- | --- | --- | --- |
| Composition | | | | | | | | | | |
| Water (g) | 350 | | 350 | | 350 | | 350 | | 350 | |
| Mixture of Polyethylene Polyamines (g) | 1 | | 5 | | 10 | | — | | — | |
| Tetraethylenepentamine (g) | — | | — | | — | | 1 | | 5 | |
| Bentonite (g) | 30 | | 30 | | 30 | | 30 | | 30 | |
| Rheology | | | | | | | | | | |
| | RT | 120° F. | RT | 120° F. | RT | 120° F. | RT | 120° F. | RT | 120° F. |
| 600 rpm | 31 | 24 | 22 | 17 | 20 | 15 | 34 | 30 | 33 | 29 |
| 300 rpm | 20 | 16 | 12 | 9 | 12 | 10 | 23 | 20 | 18 | 18 |
| 200 rpm | 15 | 13 | 8 | 7 | 9 | 8 | 19 | 15 | 14 | 15 |
| 100 rpm | 11 | 9 | 4 | 4 | 7 | 6 | 14 | 10 | 9 | 11 |
| 6 rpm | 6 | 4 | 3 | 2 | 5 | 4 | 8 | 4 | 3 | 5 |
| 3 rpm | 4 | 3 | 2 | 1 | 4 | 4 | 6 | 2 | 3 | 4 |
| PV | 11 | 8 | 10 | 8 | 8 | 5 | 11 | 10 | 15 | 11 |
| YP | 9 | 8 | 2 | 1 | 4 | 5 | 12 | 10 | 3 | 7 |
| Gel Strength, 10 sec | 8 | 4 | 4 | 3 | 5 | 4 | 6 | 5 | 6 | 7 |
| Gel Strength, 10 min | 12 | 5 | 7 | 7 | 10 | 9 | 6 | 5 | 20 | 40 |

TABLE 3-continued

Composition and Rheology of Water-Based Drilling Fluid

| Rheology | |
|---|---|
| 600 rpm | 42 |
| 300 rpm | 28 |
| 200 rpm | 21 |
| 100 rpm | 14 |
| 6 rpm | 5 |
| 3 rpm | 4 |
| PV (cP) | 14 |
| YP (lb$_f$/100ft$^2$) | 14 |
| 10-Second Gel Strength (lb$_f$/100ft$^2$) | 4 |
| 10-Minute Gel strength (lb$_f$/100ft$^2$) | 7 |

As shown by Table 3, the presence of additional additives in the water-based drilling fluid, such as a viscosifier (XC polymer), a fluid loss control agent (starch), and a weighting agent (barite), did not adversely affect the rheology of the water-based drilling fluid when compared to the rheology of water-based drilling fluids that included only water and the mixture of polyethylene polyamines. This indicates that the mixture of polyethylene polyamines is both suitable to reduce the hydration of subterranean formations and suitable for use in water-based drilling fluids that includes additives. In particular, the mixture of polyethylene polyamines will not adversely affect the rheology of the water-based drilling fluid when additional additives are included to adjust properties of the water-based drilling fluid, such as density.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the scope of the disclosure should be construed to include everything within the scope of the appended claims and their equivalents.

In a first aspect of the present disclosure, a water-based drilling fluid may include an aqueous base fluid and a mixture of polyethylene polyamines in an amount of from 1 lb$_m$/bbl to 20 lb$_m$/bbl relative to the total volume of the water-based drilling fluid. The polyethylene polyamines of the mixture may have a first chemical structure $H_2NCH_2CH_2(NHCH_2CH_2)_xNH_2$, where x may be an integer greater than or equal to 3. The average molecular weight of the polyethylene polyamines in the water-based drilling fluid having the first chemical structure may be from 200 g/mol to 400 g/mol.

A second aspect of the present disclosure may include the first aspect where the water-based drilling fluid includes the aqueous base fluid in an amount of from 50 lb$_m$/bbl to 340 lb$_m$/bbl relative to the total volume of the water-based drilling fluid.

A third aspect of the present disclosure may include either of the first or second aspects where the polyethylene polyamines of the mixture include linear polyethylene polyamines, cyclic polyethylene polyamines, branched polyethylene polyamines, or combinations of these.

A fourth aspect of the present disclosure may include any of the first through third aspects where the polyethylene polyamines of the mixture include tetraethlyenepentamine, pentaethylenehexamine, hexaethyleneheptamine, or combinations of these.

A fifth aspect of the present disclosure may include any of the first through fourth aspects where the sum of the weight percent of the tetraethylenepentamine, pentaethylenehexamine, and hexaethyleneheptamine is at least 50 wt. % of the polyethylene polyamines of the mixture.

A sixth aspect of the present disclosure may include any of the first through fifth aspects where the water-based drilling fluid has a plastic viscosity of from 1 cP to 25 cP.

A seventh aspect of the present disclosure may include any of the first through sixth aspects where the water-based drilling fluid has a yield point of from 1 lb$_f$/100 ft$^2$ to 25 lb$_f$/100 ft$^2$.

An eighth aspect of the present disclosure may include any of the first through seventh aspects where the water-based drilling fluid has a gel strength after 10 seconds of from 1 lb$_f$/100 ft$^2$ to 15 lb$_f$/100 ft$^2$.

A ninth aspect of the present disclosure may include any of the first through eighth aspects where the water-based drilling fluid may have a gel strength after 10 minutes of from 1 lb$_f$/100 ft$^2$ to 25 lb$_f$/100 ft$^2$.

A tenth aspect of the present disclosure may include any of the first through ninth aspects that further include one or more viscosifiers, one or more fluid loss control agents, one or more weighting agents, or combinations of these.

In an eleventh aspect of the present disclosure, a method for drilling a subterranean well may include operating a drill in a subterranean formation in the presence of a water-based drilling fluid. The water-based drilling fluid may include an aqueous base fluid and a mixture of polyethylene polyamines in an amount of from 1 lb$_m$/bbl to 20 lb$_m$/bbl relative to the total volume of the water-based drilling fluid. The polyethylene polyamines of the mixture may have a first chemical structure $H_2NCH_2CH_2(NHCH_2CH_2)_xNH_2$, where x may be an integer greater than or equal to 3. The average molecular weight of the polyethylene polyamines in the water-based drilling fluid having the first chemical structure may be from 200 g/mol to 400 g/mol.

A twelfth aspect of the present disclosure may include the eleventh aspect that further includes introducing the water-based drilling fluid into the subterranean formation.

A thirteenth aspect of the present disclosure may include the twelfth aspect where introducing the water-based drilling fluid into the subterranean formation comprises injecting the water-based drilling fluid through a drill string of the drill.

A fourteenth aspect of the present disclosure may include any of the eleventh though thirteenth aspects that further include circulating at least a portion of the water-based drilling fluid within the subterranean formation.

A fifteenth aspect of the present disclosure may include any of the eleventh though fourteenth aspects where the water-based drilling fluid includes the aqueous base fluid in an amount of from 50 lb$_m$/bbl to 340 lb$_m$/bbl relative to the total volume of the water-based drilling fluid.

A sixteenth aspect of the present disclosure may include any of the eleventh though fifteenth aspects where the polyethylene polyamines of the mixture include linear polyethylene polyamines, cyclic polyethylene polyamines, branched polyethylene polyamines, or combinations of these.

A seventeenth aspect of the present disclosure may include any of the eleventh though sixteenth aspects where the water-based drilling fluid has a plastic viscosity of from 1 cP to 25 cP.

An eighteenth aspect of the present disclosure may include any of the eleventh though seventeenth aspects where the water-based drilling fluid has a yield point of from 1 lb$_f$/100 ft$^2$ to 25 lb$_f$/100 ft$^2$.

A nineteenth aspect of the present disclosure may include any of the eleventh though eighteenth aspects where the water-based drilling fluid has a gel strength after 10 seconds of from 1 lb$_f$/100 ft$^2$ to 15 lb$_f$/100 ft$^2$.

A twentieth aspect of the present disclosure may include any of the eleventh though nineteenth aspects where the water-based drilling fluid may have a gel strength after 10 minutes of from 1 lb$_f$/100 ft$^2$ to 25 lb$_f$/100 ft$^2$.

It should now be understood that various aspects of the water-based drilling fluid compositions and methods for drilling subterranean wells are described and such aspects may be utilized in conjunction with various other aspects.

It is noted that one or more of the following claims utilize the term "where" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure. Rather, the appended claims should be taken as the sole representation of the breadth of the present disclosure and the corresponding scope of the various embodiments described in this disclosure. Further, it will be apparent that modifications and variations are possible without departing from the scope of the appended claims. More specifically, although some aspects of the present disclosure are identified as particularly advantageous, it is contemplated that the present disclosure is not necessarily limited to these aspects.

What is claimed is:

1. A water-based drilling fluid comprising:
    an aqueous base fluid that does not comprise salt water or seawater; and
    a mixture of polyethylene polyamines in an amount of from 1 lb$_m$/bbl to 20 lb$_m$/bbl relative to the total volume of the water-based drilling fluid, the polyethylene polyamines of the mixture comprising a first chemical structure H$_2$NCH$_2$CH$_2$(NHCH$_2$CH$_2$)$_x$NH$_2$, where x is an integer greater than or equal to 3, and where the polyethylene polyamines of the mixture comprise hexaethyleneheptamine;
    where the average molecular weight of the polyethylene polyamines of the mixture in the water-based drilling fluid comprising the first chemical structure is from 200 g/mol to 400 g/mol; and
    where one or more of:
        the water-based drilling fluid has a plastic viscosity of from 1 cP to 25 cP;
        the water-based drilling fluid has a yield point of from 1 lb$_f$/100 ft$^2$ to 25 lb$_f$/100 ft$^2$;
        the water-based drilling fluid has a gel strength after 10 seconds of from 1 lb$_f$/100 ft$^2$ to 15 lb$_f$/100 ft$^2$; or
        the water-based drilling fluid has a gel strength after 10 minutes of from 1 lb$_f$/100 ft$^2$ to 25 lb$_f$/100 ft$^2$.

2. The water-based drilling fluid of claim 1, where the water-based drilling fluid comprises the aqueous base fluid in an amount of from 50 lb$_m$/bbl to 340 lb$_m$/bbl relative to the total volume of the water-based drilling fluid.

3. The water-based drilling fluid of claim 1, where the polyethylene polyamines of the mixture comprise linear polyethylene polyamines, cyclic polyethylene polyamines, branched polyethylene polyamines, or combinations of these.

4. The water-based drilling fluid of claim 1, where the polyethylene polyamines of the mixture further comprise tetraethylenepentamine, pentaethylenehexamine, or both.

5. The water-based drilling fluid of claim 4, where the sum of the weight percent of the tetraethylenepentamine, pentaethylenehexamine, and hexaethyleneheptamine is at least 50 wt. % of the polyethylene polyamines of the mixture.

6. The water-based drilling fluid of claim 1, where the water-based drilling fluid has a plastic viscosity of from 1 cP to 25 cP.

7. The water-based drilling fluid of claim 1, where the water-based drilling fluid has a yield point of from 1 lb$_f$/100 ft$^2$ to 25 lb$_f$/100 ft$^2$.

8. The water-based drilling fluid of claim 1, where the water-based drilling fluid has a gel strength after 10 seconds of from 1 lb$_f$/100 ft$^2$ to 15 lb$_f$/100 ft$^2$.

9. The water-based drilling fluid of claim 1, where the water-based drilling fluid has a gel strength after 10 minutes of from 1 lb$_f$/100 ft$^2$ to 25 lb$_f$/100 ft$^2$.

10. The water-based drilling fluid of claim 1, further comprising one or more viscosifiers, one or more fluid loss control agents, one or more weighting agents, or combinations of these.

11. A method for drilling a subterranean well, the method comprising:
    operating a drill in a subterranean formation in the presence of a water-based drilling fluid, where the water-based drilling fluid comprises:
        an aqueous base fluid that does not comprise salt water or seawater; and
        a mixture of polyethylene polyamines in an amount of from 1 lb$_m$/bbl to 20 lb$_m$/bbl relative to the total volume of the water-based drilling fluid, the polyethylene polyamines comprising a first chemical structure H$_2$NCH$_2$CH$_2$(NHCH$_2$CH$_2$)$_x$NH$_2$, where x is an integer greater than or equal to 3, and where the mixture of polyethylene polyamines comprises hexaethyleneheptamine;
    where the average molecular weight of the polyethylene polyamines in the water-based drilling fluid comprising the first chemical structure is from 200 g/mol to 400 g/mol, and
    wherein one or more of:
        the water-based drilling fluid has a plastic viscosity of from 1 cP to 25 cP;
        the water-based drilling fluid has a yield point of from 1 lb$_f$/100 ft$^2$ to 25 lb$_f$/100 ft$^2$;
        the water-based drilling fluid has a gel strength after 10 seconds of from 1 lb$_f$/100 ft$^2$ to 15 lb$_f$/100 ft$^2$; or
        the water-based drilling fluid has a gel strength after 10 minutes of from 1 lb$_f$/100 ft$^2$ to 25 lb$_f$/100 ft$^2$.

12. The method of claim 11, further comprising introducing the water-based drilling fluid into the subterranean formation.

13. The method of claim 12, where introducing the water-based drilling fluid into the subterranean formation comprises injecting the water-based drilling fluid through a drill string of the drill.

14. The method of claim 11, further comprising circulating at least a portion of the water-based drilling fluid within the subterranean formation.

15. The method of claim 11, where the water-based drilling fluid comprises the aqueous base fluid in an amount of from 50 $lb_m$/bbl to 340 $lb_m$/bbl relative to the total volume of the water-based drilling fluid.

16. The method of claim 11, where the polyethylene polyamines of the mixture comprise linear polyethylene polyamines, cyclic polyethylene polyamines, branched polyethylene polyamines, or combinations of these.

17. The method of claim 11, where the water-based drilling fluid has a plastic viscosity of from 1 cP to 25 cP.

18. The method of claim 11, where the water-based drilling fluid has a yield point of from 1 $lb_f$/100 $ft^2$ to 25 $lb_f$/100 $ft^2$.

19. The method of claim 11, where the water-based drilling fluid has a gel strength after 10 seconds of from 1 $lb_f$/100 $ft^2$ to 15 $lb_f$/100 $ft^2$.

20. The method of claim 11, where the water-based drilling fluid has a gel strength after 10 minutes of from 1 $lb_f$/100 $ft^2$ to 25 $lb_f$/100 $ft^2$.

* * * * *